United States Patent
Guenter et al.

(10) Patent No.: US 9,124,797 B2
(45) Date of Patent: Sep. 1, 2015

(54) IMAGE ENHANCEMENT VIA LENS SIMULATION

(75) Inventors: Brian K. Guenter, Redmond, WA (US); Neel S. Joshi, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 537 days.

(21) Appl. No.: 13/170,192

(22) Filed: Jun. 28, 2011

(65) Prior Publication Data

US 2013/0002932 A1    Jan. 3, 2013

(51) Int. Cl.
*H04N 5/232* (2006.01)
*H04N 5/357* (2011.01)

(52) U.S. Cl.
CPC ......... *H04N 5/23212* (2013.01); *H04N 5/3572* (2013.01)

(58) Field of Classification Search
CPC .......................... H04N 5/23212; H04N 5/2372
USPC .............................. 348/345; 382/255; 396/241
See application file for complete search history.

(56) References Cited

U.S. PATENT DOCUMENTS

| | | | |
|---|---|---|---|
| 6,567,570 B1 | 5/2003 | Steinle et al. | |
| 7,050,102 B1 | 5/2006 | Vincent | |
| 7,377,648 B2 | 5/2008 | Gross et al. | |
| 7,437,012 B2 | 10/2008 | Carasso | |
| 7,477,802 B2 | 1/2009 | Milanfar et al. | |
| 7,489,828 B2 | 2/2009 | Asad et al. | |
| 7,616,826 B2 | 11/2009 | Freeman et al. | |
| 7,697,212 B2 | 4/2010 | Jethmalani et al. | |
| 7,792,357 B2 | 9/2010 | Kang | |
| 7,809,155 B2 | 10/2010 | Nestares et al. | |
| 7,961,970 B1 * | 6/2011 | Georgiev | 382/255 |
| 7,991,240 B2 | 8/2011 | Bakin et al. | |
| 8,467,058 B2 | 6/2013 | Lin | |
| 2003/0057353 A1 | 3/2003 | Dowski et al. | |
| 2003/0169944 A1 | 9/2003 | Dowski et al. | |
| 2004/0096125 A1 | 5/2004 | Alderson et al. | |
| 2005/0197809 A1 | 9/2005 | Dowski et al. | |
| 2005/0212911 A1 | 9/2005 | Marvit et al. | |
| 2006/0279639 A1 | 12/2006 | Silverstein et al. | |
| 2007/0236573 A1 | 10/2007 | Alon et al. | |
| 2007/0236574 A1 | 10/2007 | Alon et al. | |
| 2007/0258707 A1 | 11/2007 | Raskar | |
| 2008/0136923 A1 | 6/2008 | Inbar et al. | |
| 2008/0174678 A1 | 7/2008 | Solomon | |
| 2008/0175508 A1 | 7/2008 | Bando et al. | |

(Continued)

OTHER PUBLICATIONS

Van, et al., "Identifying Source Cell Phone Using Chromatic Aberration", Retrieved at <<http://ieeexplore.ieee.org/stamp/stamp.jsp?tp=&arnumber=4284792>>, IEEE International Conference on Multimedia and Expo, Jul. 2-5, 2007, pp. 883-886.

(Continued)

*Primary Examiner* — Mekonnen Dagnew
(74) *Attorney, Agent, or Firm* — Sandy Swain; Judy Yee; Micky Minhas (57) ABSTRACT

The described implementations relate to enhancing images. One system includes a lens configured to focus an image on an image sensor. The image sensor is configured to capture the image. The model of the lens can be known to the system. The system can also include an image enhancement component configured to receive the captured image and to utilize a simulated blur kernel of the known model to produce an enhanced image.

20 Claims, 4 Drawing Sheets

(56) References Cited

U.S. PATENT DOCUMENTS

| | | | |
|---|---|---|---|
| 2008/0252882 A1* | 10/2008 | Kesterson | 356/300 |
| 2008/0291286 A1 | 11/2008 | Fujiyama et al. | |
| 2009/0091845 A1* | 4/2009 | Katakura | 359/691 |
| 2009/0174782 A1 | 7/2009 | Kahn et al. | |
| 2009/0179995 A1 | 7/2009 | Fukumoto et al. | |
| 2009/0251588 A1* | 10/2009 | Hayashi | 348/335 |
| 2010/0033604 A1 | 2/2010 | Solomon | |
| 2010/0033618 A1 | 2/2010 | Wong et al. | |
| 2010/0079608 A1* | 4/2010 | Wong et al. | 348/222.1 |
| 2010/0195047 A1 | 8/2010 | Dreher et al. | |
| 2010/0201853 A1* | 8/2010 | Ishiga | 348/280 |
| 2010/0231732 A1 | 9/2010 | Baxansky et al. | |
| 2010/0245602 A1* | 9/2010 | Webster et al. | 348/208.4 |
| 2010/0299113 A1* | 11/2010 | Robinson et al. | 703/2 |
| 2010/0317399 A1* | 12/2010 | Rodriguez | 455/556.1 |
| 2011/0019932 A1 | 1/2011 | Hong | |
| 2011/0033132 A1 | 2/2011 | Ishii et al. | |
| 2011/0042839 A1 | 2/2011 | Tanimura et al. | |
| 2011/0054872 A1* | 3/2011 | Chen et al. | 703/13 |
| 2011/0090352 A1* | 4/2011 | Wang et al. | 348/208.6 |
| 2011/0109755 A1 | 5/2011 | Joshi | |
| 2011/0122308 A1 | 5/2011 | Duparre | |
| 2011/0134262 A1 | 6/2011 | Ogasahara | |
| 2011/0148764 A1 | 6/2011 | Gao | |
| 2011/0249173 A1 | 10/2011 | Li et al. | |
| 2011/0249866 A1 | 10/2011 | Piestun et al. | |
| 2011/0267477 A1 | 11/2011 | Kane et al. | |
| 2011/0267485 A1 | 11/2011 | Kane et al. | |
| 2011/0267486 A1 | 11/2011 | Kane et al. | |
| 2011/0267507 A1 | 11/2011 | Kane et al. | |
| 2011/0267508 A1 | 11/2011 | Kane et al. | |
| 2011/0310410 A1 | 12/2011 | Shimomura | |
| 2012/0076362 A1 | 3/2012 | Kane et al. | |
| 2012/0154626 A1 | 6/2012 | Hatakeyama et al. | |
| 2012/0169885 A1 | 7/2012 | Wang et al. | |
| 2012/0242795 A1 | 9/2012 | Kane et al. | |
| 2012/0307133 A1 | 12/2012 | Gao et al. | |
| 2013/0116981 A1 | 5/2013 | Alon et al. | |
| 2013/0132044 A1* | 5/2013 | Paris et al. | 703/2 |
| 2013/0170765 A1 | 7/2013 | Santos et al. | |
| 2013/0222624 A1 | 8/2013 | Kane et al. | |
| 2013/0266210 A1 | 10/2013 | Morgan-Mar et al. | |
| 2013/0286253 A1 | 10/2013 | Moon et al. | |
| 2013/0293761 A1 | 11/2013 | Guenter et al. | |
| 2013/0308094 A1 | 11/2013 | Mohan et al. | |
| 2013/0308197 A1 | 11/2013 | Duparre | |
| 2013/0313418 A9 | 11/2013 | Campion et al. | |
| 2013/0335535 A1 | 12/2013 | Kane et al. | |
| 2014/0064552 A1 | 3/2014 | Miyagi et al. | |

OTHER PUBLICATIONS

Le, et al., "Restoration of Defocus Blur Image Based on Global Phase Coherence", Retrieved at <<http://ieeexplore.ieee.org/stamp/stamp.jsp?tp=&arnumber=5304202>>, 2nd International Congress on Image and Signal Processing, Oct. 17-19, 2009, p. 5.

Saifuddin, Muhammad Umar Al-Maliki Bin., "Image Deblurring (Barcode)", Retrieved at <<http://psm.fke.utm.my/libraryfke/files/827_MUHAMMADUMARAL-MALIKIBINSAIFUDDIN2010.pdf>>, May 2010, p. 122.

Agarwala, et al., "Interactive Digital Photomontage", Retrieved at <<http://grail.cs.washington.edu/projects/photomontage/photomontage.pdf>>, Special Interest Group on Computer Graphics and Interactive Techniques, Aug. 8-12, 2004, pp. 1-9.

Banham, et al., "Digital Image Restoration", Retrieved at <<http://ieeexplore.ieee.org/stamp/stamp.jsp?tp=&arnumber=581363>>, IEEE Signal Processing Magazine, vol. 14, No. 2, Mar. 1997, pp. 24-41.

Cannon, Michael., "Blind Deconvolution of Spatially In-variant Image Blurs with Phase", Retrieved at <<http://ieeexplore.ieee.org/stamp/stamp.jsp?arnumber=01162770>>, IEEE Transactions on Acoustics, Speech and Signal Processing, vol. 24, No. 1, Feb. 1976, pp. 58-63.

Fergus, et al., "Removing Camera Shake from a Single Photograph", Retrieved at <<http://cs.nyu.edu/~fergus/papers/deblur_fergus.pdf>>, Special Interest Group on Computer Graphics and Interactive Techniques Conference, Jul. 30-Aug. 3, 2006, pp. 8.

Goodman, Joseph W., "Introduction to Fourier Optics", Retrieved at <<http://depa.usst.edu.cn/guangdian/gxxx/downloads/zyxt/Probsolutions.pdf>>, Sep. 22, 2005, pp. 98.

Joshi, et al., "PSF Estimation using Sharp Edge Prediction", Retrieved at <<http://vision.ucsd.edu/kriegman-grp/research/psf_estimation/psf_estimation.pdf>>, IEEE Conference on Computer Vision and Pattern Recognition, Jun. 23-28, 2008, pp. 8.

Joshi, et al., "Image Deblurring using Inertial Measurement Sensors", Retrieved at <<http://research.microsoft.com/pubs/132794/imu_deblurring.pdf>>, Special Interest Group on Computer Graphics and Interactive Techniques Conference, Jul. 26-30, 2010, pp. 1-8.

Levin, et al., "Image and Depth from a Conventional Camera with a Coded Aperture", Retrieved at <<http://groups.csail.mit.edu/graphics/CodedAperture/CodedAperture-Supplementary-LevinEtAl-SIGGRAPH07.pdf>>, Special Interest Group on Computer Graphics and Interactive Techniques Conference, Aug. 5-9, 2007, pp. 34.

Levin, et al., "Motion-invariant Photography", Retrieved at <<http://www.wisdom.weizmann.ac.il/~levina/papers/MotInv-s-LevinEtAl-SIGGRAPH08.pdf>>, Special Interest Group on Computer Graphics and Interactive Techniques Conference, Aug. 11-15, 2008, pp. 9.

Levin, et al., "Understanding and Evaluating Blind Deconvolution Algorithms", Retrieved at <<http://www.wisdom.weizmann.ac.il/~levina/papers/deconvLevinEtalCVPR09.pdf>>, IEEE Conference on Computer Vision and Pattern Recognition (CVPR), Jun. 2009, pp. 8.

Levin, Anat., "Blind Motion Deblurring using Image Statistics", Retrieved at <<http://www.wisdom.weizmann.ac.il/~levina/papers/levin-deblurring-nips06.pdf>>, Advances in Neural Information Processing Systems (NIPS), Dec. 2006, pp. 8.

Raskar, et al., "Coded Exposure Photography: Motion Deblurring using Fluttered Shutter", Retrieved at <<http://citeseerx.ist.psu.edu/viewdoc/download?doi=10.1.1.61.5198&rep=rep1&type=pdf>>, Special Interest Group on Computer Graphics and Interactive Techniques Conference, Jul. 30-Aug. 3, 2006, pp. 10.

Richardson, William Hadley., "Bayesian-based Iterative Method of Image Restoration", Retrieved at <<http://www.cs.duke.edu/courses/cps258/fall06/references/Nonnegative-iteration/Richardson-alg.pdf>>, Journal of the Optical Society of America, vol. 62, No. 1, Jan. 1972, pp. 55-59.

Shan, et al., "High-quality Motion Deblurring from a Single Image", Retrieved at <<http://www.cse.cuhk.edu.hk/~leojia/projects/motion_deblurring/deblur_siggraph08.pdf>>, Special Interest Group on Computer Graphics and Interactive Techniques Conference, Aug. 11-15, 2008, pp. 1-10.

Stewart, Charles V., "Robust Parameter Estimation in Computer Vision", Retrieved at <<http://citeseerx.ist.psu.edu/viewdoc/download?doi=10.1.1.83.4992&rep=rep1&type=pdf>>, SIAM Review, vol. 41, No. 3, Sep. 1999, pp. 513-537.

Veeraraghavan, et al., "Dappled Photography: Mask Enhanced Cameras for Heterodyned Light Fields and Coded Aperture Refocusing", Retrieved at <<http://www.merl.com/papers/docs/TR2007-115.pdf>>, TR2007-115, Jul. 2007, pp. 14.

Xu, et al., "Two-phase Kernel Estimation for Robust Motion Deblurring", Retrieved at <<http://www.cse.cuhk.edu.hk/~leojia/projects/robust_deblur/robust_motion_deblurring.pdf>>, 11th European Conference on Computer Vision, Sep. 5-11, 2010, pp. 157-170.

Yuan, et al., "Image Deblurring with Blurred/Noisy Image Pairs", Retrieved at <<http://www.cs.ust.hk/~quan/publications/yuan-deblur-siggraph07.pdf>>, Special Interest Group on Computer Graphics and Interactive Techniques Conference, Aug. 5-9, 2007, pp. 9.

Liu, et al., "Simultaneous Image Formation and Motion Blur Restoration via Multiple Capture"; Proceedings of IEEE International Conference on Acoustics, Speech, and Signal Processing, vol. 03, 2001, pp. 4.

Chiang, et al., "Local Blur Estimation and Super-Resolution"; IEEE Computer Society Conference on Computer Vision and Pattern Recognition (CVPR'97), 1997, pp. 6.

(56) References Cited

OTHER PUBLICATIONS

Elder, et al., "Local Scale Control for Edge Detection and Blur Estimation"; IEEE Transactions on Pattern Analysis and Machine Intelligence, vol. 20, No. 7, Jul. 1998, pp. 699-715.

Klein, et al., "Tightly Integrated Sensor Fusion for Robust Visual Tracking"; Image and Vision Computing; vol. 22, Issue 10; 2004; pp. 769-776.

Strelow, et al., "Optimal Motion Estimation from Visual and Inertial Measurements"; Proceedings of the Workshop on Applications of Computer Vision, Dec. 2002, pp. 6.

Tai, et al., "Image/Video Deblurring using a Hybrid Camera"; IEEE Conference on Computer Vision and Pattern Recognition (CVPR), 2008, pp. 8.

Bascle, et al., "Motion Deblurring and Super-Resolution from an Image Sequence"; Proceedings of the 4th European Conference on Computer Vision, vol. II, 1996; pp. 573-582.

Ben-Ezra, et al., "Motion-Based Motion Deblurring", IEEE Transactions on Pattern Analysis and Machine Intelligence, vol. 26, No. 6, Jun. 2004, pp. 689-698.

Kang, S. B.; "Automatic Removal of Chromatic Aberration From a Single Image," in IEEE Conference on Computer Vision and Pattern Recognition, CVPR 2007, pp. 1-8.

Kee et al., "Modeling and removing spatially-varying optical blur," Retrieved at <<http://www.cs.dartmouth.edu/~erickee/papers/iccp11.pdf>> in Computational Photography (ICCP), 2011 IEEE International Conference on, pp. 1-8.

Krist, J.E.; "Deconvolution of Hubble Space Telescope Images Using Simulated Point Spread Functions," in Astronomical Data Analysis Software and Systems, 1992, pp. 226-228.

Maeda et al., "Integrating Lens Design with Digital Camera Simulation," retrieved at <<http://white.stanford.edu/~brian/papers/ise/Maeda-Optics-SPIE-EI-5678-5.pdf>> Proceedings of the SPIE, Feb. 2005, vol. 5678, pp. 48-58.

McGuire Jr., J.P.; "Designing Easily Manufactured Lenses Using a Global Method," in International Optical Design Conference, 2006; SPIE-OSA vol. 6342, pp. 63420O-1-63420O-11.

Meiron, J.; "Damped Least-Squares Method for Automatic Lens Design," in Journal of the Optical Society of America (JOSA), Sep. 1965, vol. 55, No. 9; pp. 1105-1107.

Nayar et al., "Real-time focus range sensor," Retrieved at <<http://classes.soe.ucsc.edu/cmps290b/Fall05/readings/nayar-pami96.pdf>> IEEE Trans. Pattern Analysis amd Machine Intelligence, Zvol. 18 No. 12, Dec. 1996, pp. 1186-1198.

Scalettar, B.A. et al.; "Dispersion, Aberration and Deconvolution in Multi-Wavelength Fluorescence Images," in Journal of Microscopy, Apr. 1996, vol. 182, Part 1, pp. 50-60.

Small et al., "Enhancing diffraction-limited images using properties of the point spread function," Retrieved at <<http://www.sbsp-limb.nichd.nih.gov/assets/pdfs/article_small_2006_opex.pdf>>, vol. 14, Apr. 17, 2006, Issue 8, pp. 3193-3203.

Zhou, "Accurate Depth of Field Simulation in Real Time," Retrieved at <<http://www.cg.tuwien.ac.at/~ginko/v26ipp015-023.pdf>>, Mar. 23, 2007, vol. 26 (2007), No. 1, pp. 15-23.

Zhou et al., "Coded aperture pairs for depth from defocus," Retrieved at <<http://www.wisdom.weizmann.ac.il/~vision/courses/2010_2/papers/Zhou_ICCV09.pdf>>, in ICCV, Kyoto, Japan, Oct. 2009, 8 pages.

"Non-Final Office Action," U.S. Appl. No. 12/616,782, Mailed Date: Oct. 21, 2011, 12 pages.

"Response to Non-Final Office Action," U.S. Appl. No. 12/616,782, filed Jan. 6, 2012, 10 pages.

"Final Office Action," U.S. Appl. No. 12/616,782, Mailed Date: Jan. 30, 2012, 12 pages.

"Response to Final Office Action," U.S. Appl. No. 12/616,782, filed Apr. 26, 2012, 7 pages.

"Notice of Allowance," U.S. Appl. No. 12/616,782, Mailed Date: May 17, 2012, 9 pages.

"Requirement for Restriction Election," U.S. Appl. No. 13/465,959, Mailed Date: Sep. 18, 2013, 6 pages.

"Response to Election Restriction," U.S. Appl. No. 13/465,959, filed Oct. 7, 2013, 6 pages.

"Non-Final Office Action," U.S. Appl. No. 13/465,959, Mailed Date: Jan. 10, 2014, 16 pages.

"Response to Non-Final Office Action," U.S. Appl. No. 13/465,959, filed Apr. 8, 2014, 11 pages.

Notice of Allowance, U.S. Appl. No. 13/465,959, Mailed Date: Jul. 23, 2014, 8 pages.

"CIE Fluorescent Series: F1 to F12, 380nm to 730nm, Sampled at 5nm", from Munsell Color Science Laboratory, Online at <<<www.cis.rit.edu/research/mcs12/online/CIE/Fluorescents.htm>>>, 4 Pages.

Brauers, J. et al.; "Direct PSF Estimation Using a Random Noise Target," in Digital Photography VI, 2010, Proceedings of SPIE-IS&T Electronic Imaging, SPIE vol. 7537, pp. 75370B-1-75370B-10.

Cathey, W.T. and E.R. Dowski; "New Paradigm for Imaging Systems," in Applied Optics, vol. 41, No. 29, Oct. 2002, pp. 6080-6092.

Conchello, J.A. and J.W. Lichtman; "Optical Sectioning Microscopy," in Nature Methods, vol. 2, No. 12, Dec. 2005, pp. 920-931; [Published Online Nov. 18, 2005 at <<<www.nature.com/naturementhods>>>].

Hanrahan, P. and R. Ng; "Digital Correction of Lens Aberrations in Light Field Photography," in International Optical Design, 2006, p. WB2.

Hausler, G.; "A Method to Increase the Depth of Focus by Two Step Image Processing," in Optics Communications, vol. 6, No. 1, Sep. 1972, pp. 38-42.

Yichang Shih et al., Image Enhancement Using Calibrated Lens Simulations, Computer Vision—ECCV 2012, Lecture Notes in Computer Science, vol. 7575, 2012, pp. 42-56.

"Notice of Allowance," Mailed May 16, 2015, from U.S. Appl. No. 13/465,959, 8 pages.

\* cited by examiner

IMAGE ENHANCEMENT VIA LENS SIMULATION

BACKGROUND

Image capturing devices, such as cameras, tend to have a lens that focuses an image on an image sensor, such as film or a charge coupled device (CCD). Lens distortions, called aberrations, limit the sharpness of the image formed by the lens. These aberrations are intrinsic to the physics of optical image formation and will be present even if the lens has no physical imperfections (e.g., manufacturing flaws) and is perfectly focused. Generally, the more optical elements in a lens the smaller the aberrations, but each optical element adds additional cost. To reduce cost, especially in small format devices like cell phones, many cameras use lenses with significant artifacts and the image resolution is not limited by the image sensor but by the lens optics.

SUMMARY

The described implementations relate to enhancing images. One system includes a lens configured to focus an image on an image sensor. The image sensor is configured to capture the image. The model of the lens can be known to the system. The system can also include an image enhancement component configured to receive the captured image and to utilize a simulated blur kernel of the known lens model to produce an enhanced image.

Another implementation can obtain a wave optic simulation of a lens model. This implementation can compute a point spread function for the lens model from the wave optic simulation. The implementation can also create blur kernels for the lens model from the point spread function.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

DETAILED DESCRIPTION

Overview

This patent relates to enhancing images (e.g., photos). The images can be captured by an imaging device, such as a dedicated camera or video camera, or by a device that offers a camera functionality, such as a cell phone, smart phone, or personal digital assistant, among others. As used herein, a device that offers a camera functionality can be thought of as a camera regardless of other functionalities offered by the device. The camera can include a lens. The design of the lens can affect images captured through the lens. The present implementations can obtain a simulation of the lens. The simulation can be utilized to enhance the images captured through the lens.

Figure 1:
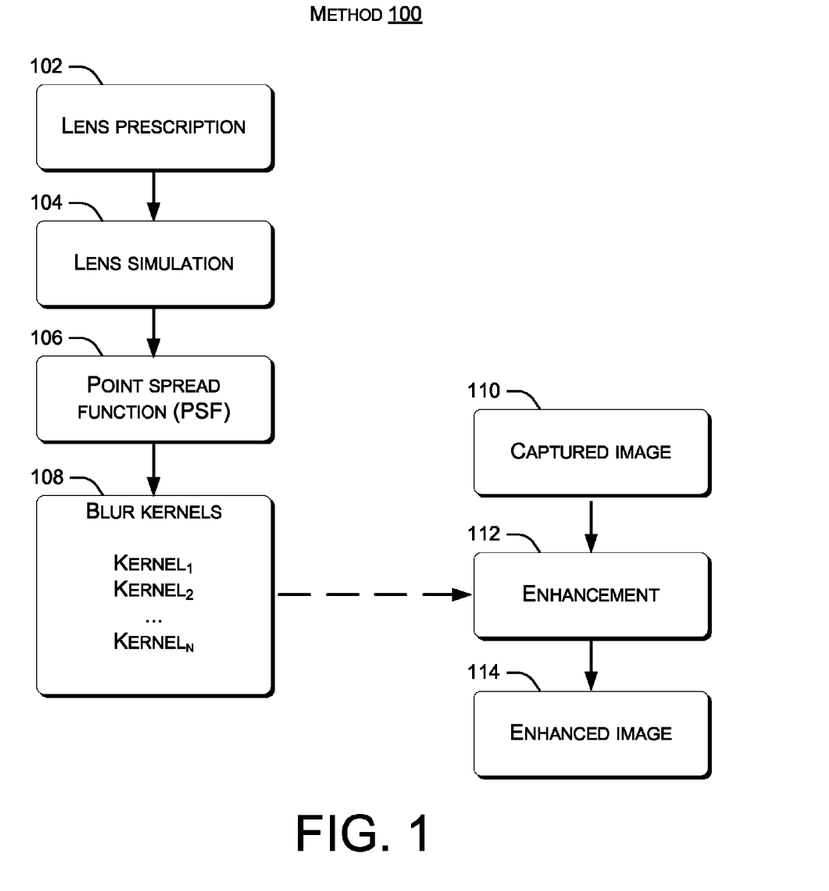
FIG. 1 is a flowchart of an exemplary image enhancement technique in accordance with some implementations of the present concepts.

For purposes of explanation consider introductory FIG. 1, which shows an image enhancement method 100. Rather than obtaining a lens and physically evaluating the lens, this implementation can obtain a prescription for a model of the lens (lens model) at 102.

The prescription can be thought of as defining the design parameters of the lens model. Stated another way, the prescription can provide a precise specification of the optical properties of the lens. All lenses have optical aberrations which cause even perfectly focused images to be less than perfectly sharp. These aberrations are inherent in the physics of optical image formation, and are not due to manufacturing defects.

An individual lens model may be utilized in a single model of cameras. For instance, the lens model may be designed for a specific smart phone model. In another case, a lens model may be incorporated into multiple different camera models. In a further example, the lens model may be interchangeable between different camera models. For instance, SLR camera lenses may be used with multiple camera models.

The method can perform a wave optic simulation of the prescription of the lens model at 104. Wave optic simulation details are provided below under the heading "COMPUTING A PSF FOR A LENS MODEL". Briefly, a wave optics simulation treats light as a wave and makes certain assumptions about the behavior of the light to simplify calculations.

The method can compute a point spread function (PSF) for the lens model from the wave optic simulation at 106. Computing a point spread function is described in more detail below under the heading "COMPUTING A PSF FOR A LENS MODEL". Briefly, the wave optics simulation, along with the lens specifications can be used to model lens aberrations and compute the PSF.

The method can create blur kernels for the lens model from the point spread function at 108. The blur kernels are described in more detail below under the heading "DECONVOLUTION USING LENS PSFs".

The method can obtain a captured image at 110. The method can be performed by the device that captures the image or the method can obtain the image from the device.

The method can enhance the captured image utilizing the blur kernels at 112. For instance, the method can enhance image sharpness, refocus the image, reduce vignetting, reduce chromatic aberration of the image, reduce spherical aberration of the image, and/or reduce other forms of aberration of the image. The method can then output the enhanced image at 114.

System Examples

Figure 2:
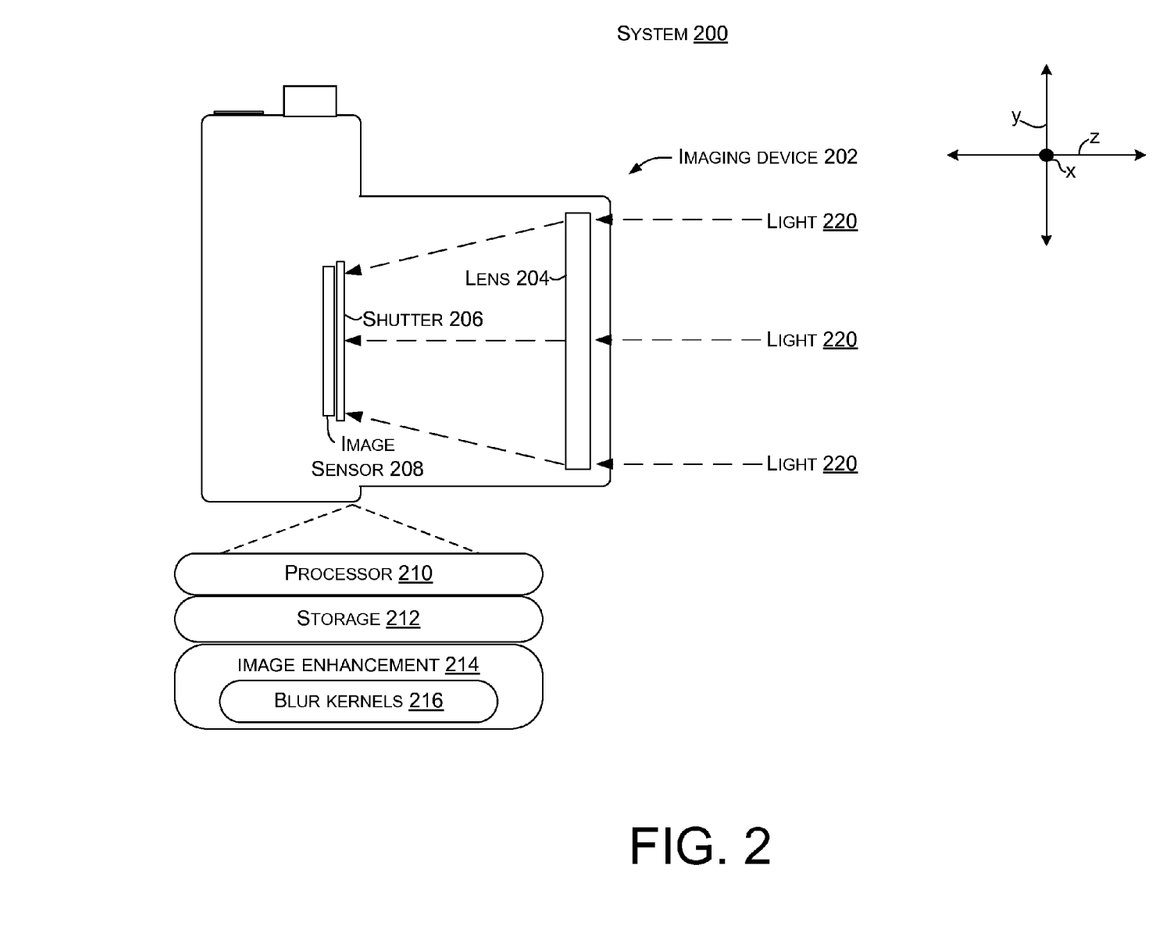
FIGS. 2-3 show exemplary image enhancement systems in accordance with some implementations of the present concepts.
Figure 3:
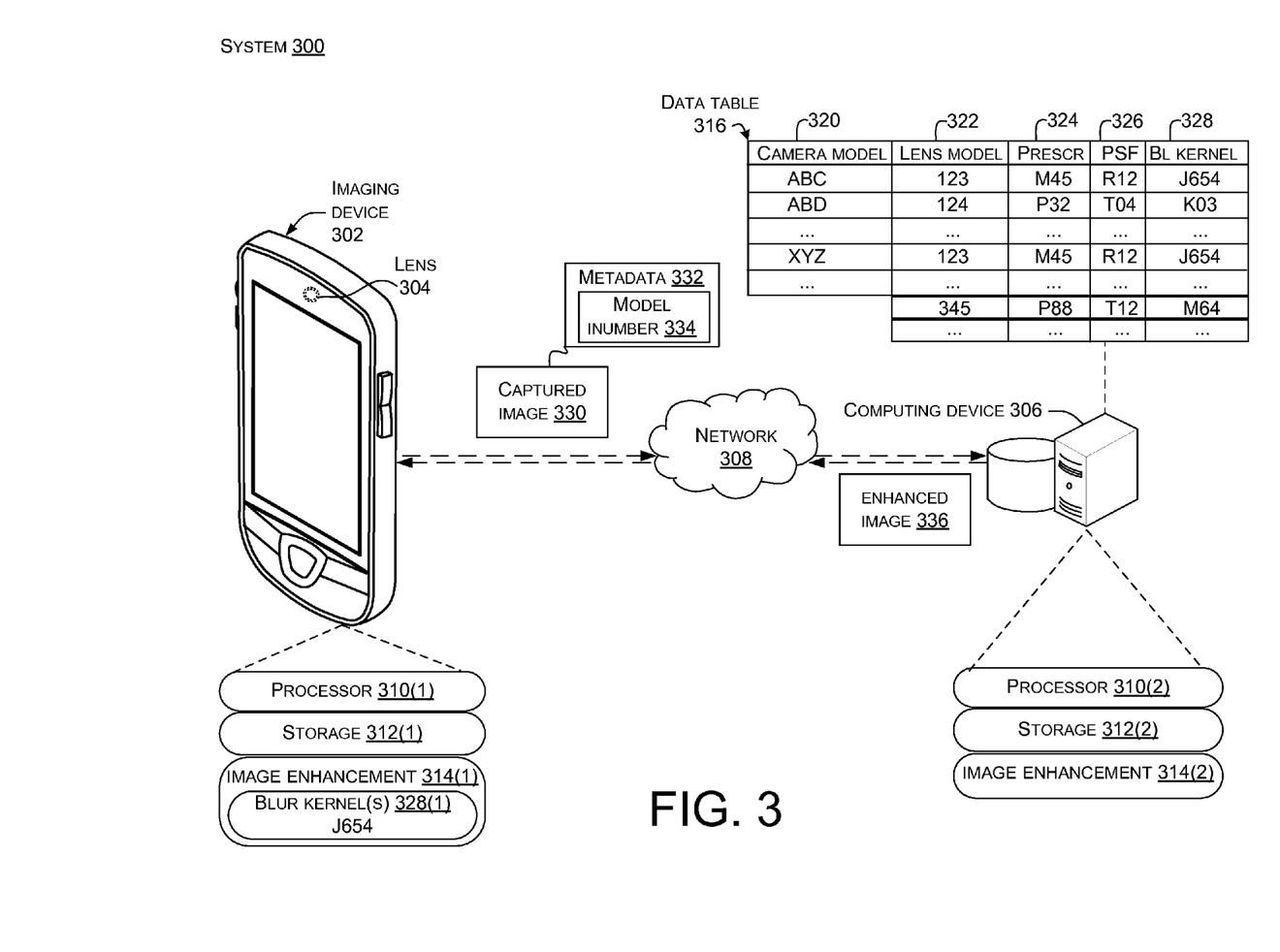

FIGS. 2-3 show examples of systems that can accomplish the image enhancement concepts introduced above.

FIG. 2 shows a system 200 that includes an imaging device 202. In this case, the imaging device includes a lens 204, a shutter 206, an image sensor 208, a processor 210, storage 212, and an image enhancement component 214. The image enhancement component can include and/or access blur kernels 216 for lens 204.

Lens 204 serves to focus electromagnetic energy (e.g., light indicated by arrows 220) on image sensor 208 when shutter 206 opens. Taken collectively, the light 220 can be thought of as creating an optical image that strikes image sensor 208.

Image sensor 208 can be configured to convert an optical image to an electrical signal (e.g., captured image). Examples of image sensors can include film, charge coupled devices (CCDs) and complementary metal oxide semiconductor (CMOS) types, among others. In some configurations, the image sensor can be a generally planar array of pixels (arranged along an xy-plane in FIG. 2). Thus, light from lens 204 strikes a generally planar surface of the image sensor and can activate individual pixels of the image sensor.

Imaging device 202 can be thought of as a computer. The term "computer" or "computing device" as used herein can mean any type of device that has some amount of processing capability and/or storage capability. Processing capability can be provided by one or more processors that can execute data in the form of computer-readable instructions to provide a functionality. Data, such as computer-readable instructions, can be stored on storage. The storage can be internal and/or external to the computing device. The storage can include any one or more of volatile or non-volatile memory, hard drives, flash storage devices, and/or optical storage devices (e.g., CDs, DVDs etc.), among others. As used herein, the term "computer-readable media" can include transitory and non-transitory instructions. In contrast, the term "computer-readable storage media" excludes transitory instances. Computer-readable storage media can include "computer-readable storage devices". Examples of computer-readable storage devices include volatile storage media, such as RAM, and non-volatile storage media, such as hard drives, optical discs, and flash memory, among others.

Examples of computers can include traditional computing devices, such as personal computers, cell phones, smart phones, personal digital assistants, cameras, video cameras, or any of a myriad of ever-evolving or yet to be developed types of computing devices.

Returning to FIG. 2, the image enhancement component 214 can utilize the blur kernels 216 to enhance the captured image to create an enhanced image. The enhanced image can be of higher quality in regards to one or multiple parameters. This aspect is described in more detail above and below.

FIG. 3 shows another system 300 that includes an imaging device 302 that has a lens 304. In this case, the imaging device is manifest as a smart phone and the lens 304 is positioned on a back surface of the imaging device and is therefore shown in 'ghost' (e.g., dashed lines). System 300 also includes a computing device or computer 306. The imaging device 302 and the computer 306 can communicate over a network 308. The network can be any type of network, such as a user's home wireless network, the Internet, Bluetooth, and/or a cellular network, such as a third generation (3G) or fourth generation (4G) network, among others.

In this configuration, computer 306 may belong to an owner of imaging device 302 or it may be a server computing device controlled by a different entity. Further, while a distinct computer 306 is illustrated here, the provided functionality can be offered in a cloud computing scenario.

In this case, imaging device 302 includes a processor 310(1), storage 312(1), and an image enhancement component 314(1). Similar elements can also occur on computer 306 and are distinguished by the suffix "(2)". Further, computer 306 can maintain and/or access a data table 316 that relates camera model and/or lens information.

In the illustrated configuration, data table 316 can relate camera models (column 320), lens models (column 322), lens prescriptions (column 324), PSF (column 326), and blur kernels (column 328).

In data table 316, horizontal row 1 relates to hypothetical camera model "ABC". This camera model has lens model "123", prescription "M45", PSF "R12" and blur kernel "J654" (hypothetically named elements). Note that this particular lens model is also used with another camera model (e.g., the "XYZ" model camera). Further, data table 316 can include rows for lenses, such as lens "345" that may be purchased separately from imaging devices, such as cameras. One such common example relates to SLR cameras where the lenses are often purchased separately from the camera. An individual lens can be releasably or removeably connected to the camera. The user can remove the lens and connect another lens that may be more suitable for a given scenario. For instance, the user may install a wide angle lens to capture photos of scenery and install a zoom lens for wildlife photos. Note that other implementations can utilize other alternative or additional columns to those shown here in data table 316. For instance, the data table may have a listing of camera serial numbers associated with a camera model. The purpose of the data table is explained in more detail below.

In one implementation, imaging device 302 may function in a generally standalone configuration much like imaging device 202 of FIG. 2. In such a case, image enhancement component 314(1) can be a pre-installed application or a downloadable application that is stored on storage 312(1) and run by processor 310(1).

In the former instance (e.g., pre-installed), the image enhancement component 314(1) may be intended for the model of imaging device to which imaging device 302 belongs. Stated another way, the lens model may have been specified by the manufacturer of the imaging device. Thus, the imaging device model may include a lens model to which the image enhancement component 314(1) is configured. For instance, the image enhancement component can be installed along with information derived from simulation of the lens model. For example, the image enhancement component may include the blur kernels for the lens. (This aspect will be described in more detail below). In such a case, the image enhancement component 314(1) and/or associated lens simulation derived information can be pre-installed on the imaging device by a manufacturer or an intermediary that prepares and/or sells the imaging device to an end user (e.g., customer).

In the latter instance (e.g., downloadable application), the image enhancement component 314(1) may obtain identifying information, such as a model and/or serial number from the imaging device 302. The image enhancement component 314(1) can then use the identifying information to obtain blur kernels 328(1) for the lens 304. For instance, the image enhancement component 314(1) can access data table 316 over network 308. The image enhancement component 314(1) can access the row of the data table relating to the known camera model, which in this example is "ABC". The row in the data table relating to camera model "ABC" references that the blur kernel for the lens of this camera model is "J654". The image enhancement component 314(1) can use the blur kernel 328(1) (e.g., J654) to enhance images captured on imaging device 302.

System 300 can also support a distributed image enhancement configuration for imaging device 302. In such a case, assume that an image is captured (e.g., captured image 330) on imaging device 302. The imaging device can associate metadata 332 with the captured image 330. In this case, the metadata can include the model number 334 of imaging device 302. In this example, the model is hypothetical model "ABC". The imaging device 302 can communicate the captured image 330 to computer 306. The computer can use the model number 334 (ABC) to identify the corresponding blur kernel (J654) in the data table 316. The computer's image enhancement component 314(2) can perform image enhancement on the captured image 330 utilizing the blur kernel to generate enhanced image 336. The computer 306 can communicate the enhanced image 336 back over network 308 to imaging device 302 for displaying to a user of the device. Alternatively or additionally, computer 306 may store the enhanced image 336 and/or send the enhanced image over network 308 to another device that is not illustrated in FIG. 3.

Alternatively or additionally, the computer's image enhancement component 314(2) can generate and/or maintain data table 316. For instance, camera model information and/or lens model information and associated lens prescriptions can be automatically and/or manually obtained. The computer's image enhancement component 314(2) can calculate the corresponding PSF and/or blur kernel(s) for the lens. Techniques for generating the PSF and/or blur kernel(s) from the prescription are described in more detail below under the heading "COMPUTING A PSF FOR A LENS MODEL". This information can then be associated as a row of the data table 316.

In the illustrated implementation imaging device 302 is configured with a general purpose processor 310(1) and storage 312(1). In some configurations, the imaging device can include a system on a chip (SOC) type design. In such a case, functionality provided by the imaging device can be integrated on a single SOC or multiple coupled SOCs. In one such example, the imaging device can include shared resources and dedicated resources. An interface(s) can facilitate communication between the shared resources and the dedicated resources. As the name implies, dedicated resources can be thought of as including individual portions that are dedicated to achieving specific functionalities. For instance, in this example, the dedicated resources can include image enhancement component 314(1).

Shared resources can be storage, processing units, etc. that can be used by multiple functionalities. In this example, the shared resources can include the processor. In one case, image enhancement component 314(1) can be implemented as dedicated resources. In other configurations, this component can be implemented on the shared resources and/or the processor can be implemented on the dedicated resources.

Lens Prescriptions

The lens prescription contains the parameter values of the lens model. The present concepts can model the effects of one or more of these parameter values, such as: glass formulas for the index of refraction as a function of wavelength, the radius of curvature of the front and back surfaces of each lens element (or polynomial surface functions if the surface is aspheric), element diameter, type of antireflection coating material and thickness, and the position of elements along the optical axis. Still further examples of parameter values that can be utilized include, glass transmittance over the visible spectrum and coefficient of thermal expansion, among others.

Glass formulas model the variation of the index of refraction of an optical material as a function of wavelength, $\lambda$. A first example of a formula that can be employed is:

$$n^2 = a_0 + a_1\lambda^2 + a_2\lambda^{-22} + a_3\lambda^{-4} + a_4\lambda^{-6} + a_5\lambda^{-8}$$

and a second example of a formula that can be employed is:

$$n^2 - 1 = \frac{K_1\lambda^2}{\lambda^2 - L_1} + \frac{K_2\lambda^2}{\lambda^2 - L_2} + \frac{K_3\lambda^2}{\lambda^2 - L_3}$$

where $\lambda$ is the wavelength of the light.

Some implementations can utilize a lens simulator that models lens elements with spherical surfaces and a single layer antireflection coating. Other implementations can offer lens simulations of aspherical lenses and/or uncoated and/or multicoated lenses.

Computing a PSF for a Lens Model

Conventional geometric optics, using conventional ray tracing, do not accurately model the lens PSF unless it is 10 to 20 times larger than the Airy disk size. A well designed lens can have a PSF on the order of the Airy disk size so more accurate simulations tend to be necessary for good deconvolution results. At least some of the present implementations can utilize a wave optics simulation instead. Some of the present implementations can employ a "hybrid" ray tracing/wave optics simulator that computes the lens PSF by evaluating the scalar Rayleigh-Sommerfield diffraction integral:

$$U(p_1) = \frac{1}{j\lambda} \int\int_\Sigma U(p_0) \frac{e^{jkr}}{r} \cos\Theta ds \qquad (1)$$

where $\lambda$ is the wavelength, $$k = \frac{2\pi}{\lambda}$$

is the wavenumber, $U(p_0)$ is the field intensity at point $p_0$ on the wavefront, r is the distance from a point on the wavefront $p_0$ and a point on the image plane, $p_1$, and $\Theta$ is the angle between the normal to the wavefront and the vector $p_1-p_0$. This integral gives the field intensity, $U(p_1)$, at a point $p_0$ on the image plane. The double integral is evaluated over the surface of the wavefront, (such as the lens surface closest to the image sensor), and the image plane itself.

Some of the present implementations can numerically approximate the integral of eq. (1) by sampling at many locations (such as about $10^5$ to about $5 \times 10^6$ samples) across the lens and summing the complex phasor $$U(p_1) \frac{e^{jkr}}{r} \cos\Theta$$

across every pixel in the image plane sampling window. Image sensors measure power, which is proportional to the square of intensity, so the sensor signal at the image plane is $U(p_0)^2$.

In one case, for polychromatic light eq. 1 is evaluated for each wavelength, $\lambda$, and the results summed incoherently. Rays are traced through all but the last lens surface using conventional ray tracing, but keeping track of the complex phase as the ray passes through optical elements. At the last lens surface the ray is treated as a full phasor quantity. In principle, the phasor evaluation for each ray should cover the entire image plane but this may be computationally infeasible for high resolution sensors. However, for a lens with reasonably corrected aberrations the PSF rapidly falls to zero away from the ray image plane intersection. Some implementations can exploit this fact and compute a conservative upper bound on the size of the phasor region. This greatly reduces computation while still accurately representing the PSF of the lens.

The above mentioned implementations can first compute a local origin for the PSF by finding the centroid of all rays intersecting the image plane. Then all rays which intersect the image plane at a distance greater than $kd^6$ from the local origin can be discarded, where k is an empirically chosen constant, and d is defined as:

$$d = \frac{1.22\lambda}{NA}$$

Thus, d is the diameter of the first maximum of the Airy disk. The numerical aperture, NA, is given by:

$$NA = n \sin(\Theta_{max})$$

where n is the index of refraction of the medium the last ray is traveling through.

The numerical aperture, NA, can be computed by sampling on a radial line along the lens, passing through the optical axis, and determining the maximum angle, Θ, at which rays from the object point are not occluded.

For lenses with circular aperture stops, the PSFs on any circle in the image plane, with center on the optical axis, are identical, and the present concepts can exploit this to reduce computation. Instead of computing PSFs at points on a rectangular grid, some implementations can compute PSFs along a radial line in the image plane, which passes through the optical axis of the system.

To achieve a high (and potentially the highest possible) resolution of the measured PSF's some implementations can use a monochrome sensor with small pixels (such as 2.2 microns), and sequential RGB illumination from a three color LED lamp. Because the PSF is strongly dependent on wavelength, some implementations can compute the PSF at 18 wavelengths for each color channel and sum these incoherently to give the final PSF for each color channel.

Deconvolution Using Lens PSFs

Spatially invariant image blur can be modeled as the convolution of a latent sharp image with a shift-invariant kernel plus noise, which is typically considered to be additive white Gaussian noise. Specifically, blur formation can be modeled as:

$$B = I \circledast K + N, \tag{2}$$

where K is the blur kernel, $N \sim N(0, \sigma^2)$ is the noise. With a few exceptions, most image deblurring work assumes a spatially invariant kernel whether for motion blur or defocus blur; however, this often does not hold in practice for both camera motion or optical blur, even when the scene is all at one depth.

One technique for removing optical blur can entail a spatially varying deconvolution method used for camera motion deblurring. Briefly, this camera motion deblurring technique can gather motion-related information about an imaging device when an image is captured. For instance, the motion-related information can relate to linear motion, rotational or angular motion, velocity, and/or acceleration, among others. The motion-related information can be used with the image to compensate for or correct blurring caused by the motion of the imaging device. In some cases, the motion-related information can be used to remove blur from the image in a uniform manner. In other cases, the motion-related information can be used non-uniformly with the image. For instance, some regions of the image may be treated differently than other regions. In one such example, the motion-related information can be used with the image at an individual pixel level.

Considered from another perspective, the motion-related information can be thought of as defining a blur function. By knowing the blur function, a corrected or true image can be recovered by deblurring the captured image with a non-blind deconvolution method. Further detail regarding this technique can be obtained from U.S. patent application Ser. No. 12/616,782, filed on 2009 Nov. 12, which is hereby incorporated by reference in its entirety.

By utilizing the above mentioned technique, the spatially invariant kernel and convolution in Equation 2 can now be replaced by a sparse re-sampling matrix that models the spatially-variant blur, and the convolution process is now a matrix-vector product:

$$\vec{B} = A\vec{I} + N. \tag{3}$$

Each column of A is the un-raveled kernel for the pixel represented by that column. Thus, the blurred response at a pixel in the observed image is computed as a weighted sum, as governed by A, of the unknown latent image I formed into a column-vector.

Recall that the present concepts address lens induced artifacts rather than motion induced artifacts. As a result, in the present implementations, optical blur tends to be relatively consistent for pixels that are relatively proximate to one another. Leveraging this insight allows for relatively sparse pixel sampling. For instance, in one implementation sampling 50 pixels on a 5 mega-pixel image sensor can be adequate by utilizing a nearest-neighbor interpolation from the sampled kernels. As discussed above, some implementations of the simulation pipeline can compute kernels along a radial slice of the image plane. Thus, the radial slice can be rotated over the image plane to get a 2D sampling of kernels. Computing resources can be saved by only storing the sparsely sampled kernels in a matrix instead of a kernel per-pixel, so A is not explicitly formed. However, these implementations can easily compute the matrix-vector product with A by indexing into the internal kernel data structure. Some implementations leverage this detail to make large image deconvolution possible. For instance, in order to deblur a five mega-pixel image, matrix storage can be reduced to less than two gigabytes, in one implementation.

Some implementations can employ a Bayesian framework to find the most likely estimate of the sharp image I, given the observed blurred image B, the blur matrix A, and noise level $\sigma^2$ using a (potential) maximum a posteriori (MAP) estimation. This maximization can be expressed over the probability distribution of the posterior using Bayes' rule. The result can be a (potential) minimization of a sum of negative log likelihoods:

$$P(I|B, A) = P(B|I)P(I)/P(B) \tag{4}$$

$$\underset{I}{\text{argmax}}\, P(I|B) = \underset{I}{\text{argmin}}\, [L(B|I) + L(I)]. \tag{5}$$

The problem of deconvolution is now reduced to reducing and/or potentially minimizing the negative log likelihood terms. Given the blur formation model (Equation 2), the "data" negative log likelihood is:

$$L(B|I) = \|\vec{B} - A\vec{I}\|^2 / \sigma^2. \tag{6}$$

The "image" negative log likelihood can be thought of as a sparse gradient penalty, which enforces a hyper-Laplacian distribution: $L(I)=\lambda\|\nabla I\|^{0.8}$. The minimization can be performed using a minres solver in an iteratively reweighted least-squares framework.

Refocusing

When a photograph is taken with a larger aperture lens setting, images off the plane of focus can be blurry due to defocus blur. The process of compensating for this blur is typically referred to as refocusing. The goal of image refocusing is to create a sharp image from one or more input images. To create an "all-in-focus" image, the present implementations can deblur a shallow depth of field image using kernels for several distances in front of and behind the focal plane. A graphcut framework can then be used to find a labeling for each point that reduces and potentially minimizes a data cost that reflects the quality of the deconvolution for each part of the image, subject to a smoothness constraint. Some implementations can use the kurosis (4th moment) of image x,y gradients in a 101×101 pixel window as the per-pixel data cost and use a fixed label cost with gradient based static clues for the smoothness cost. By utilizing the computed PSFs, the present implementations can either deblur the image such that only the optical blur artifacts at the focal plane are removed or an all in-focus image can be created. Further, the present implementations need not affect intentional blur. Image-based methods often cannot distinguish unintended lens-induced blur from intentional defocus blur, e.g., when there is an intentional shallow depth of field. As many methods treat all types of blur equally, intentional defocus blur may be removed, creating an over-sharpened image. In contrast, the present techniques do not suffer from such issues. Further, the present implementations can be achieved without modifying the camera hardware.

In summary, the present implementations can enhance captured images by correcting lens-caused aberrations. For instance, a PSF can be obtained utilizing the lens prescription. The captured image can be enhanced by inverting the lens PSF to reduce and/or eliminate some or all of the lens-caused aberrations. In one case, this inversion can be used to increase sharpness at an in focus depth plane, or to refocus the image to a different depth plane. These implementations can use an accurate simulation of the lens optics to compute the lens PSF, rather than recover the blur from the image itself. Even inexpensive modern lens systems can be accurately simulated using the lens simulation, such as a CAD model of the lens, without calibrating the model to a particular physical lens by making measurements. This allows enhancement of many aspects of lens performance, such as sharpness, geometric distortion, and chromatic and spherical aberration. Furthermore, by only addressing optics artifacts, these implementations can leave intended blur effects such as intentional shallow depth of field. Previous methods often treat all types of blur equally, thus intentional defocus blur may be removed, creating an over-sharpened image.

Figure 4:
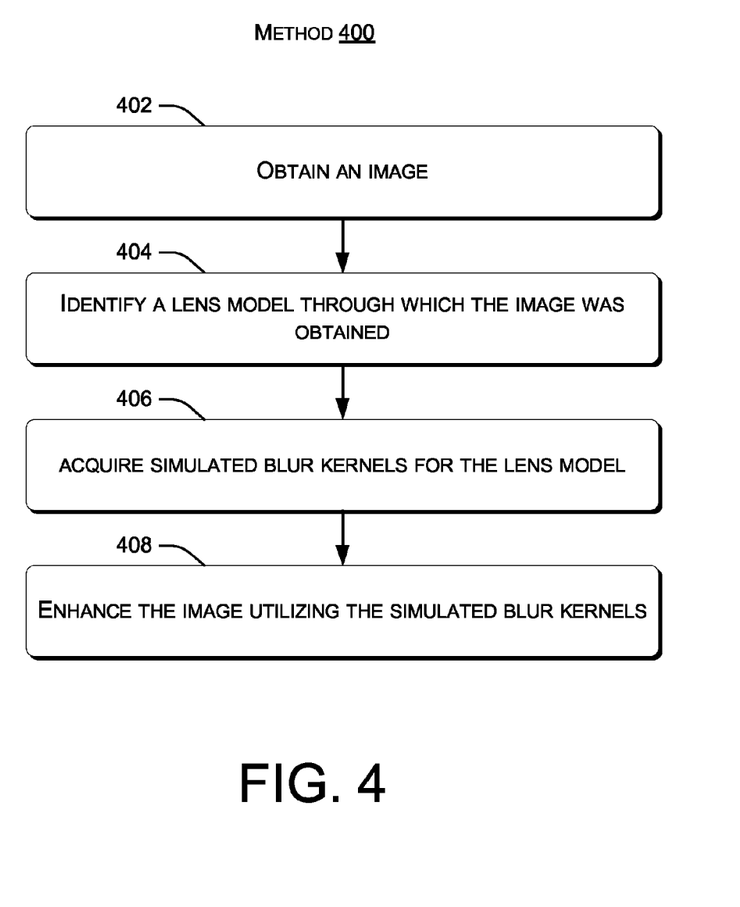
FIG. 4 is a flowchart of an exemplary image enhancement technique in accordance with some implementations of the present concepts.

The discussion above offers a very detailed example of image enhancement techniques that can be employed in some implementations. FIG. 4 returns to a broad discussion of image enhancement techniques offered by the present concepts.

Further Image Enhancement Example

FIG. 4 illustrates a flowchart of a technique or method 400 that is consistent with at least some implementations of the present concepts.

At block 402, the method can obtain an image. At block 404, the method can identify a lens model through which the image was obtained. For instance, information about the lens and/or camera model may be associated with the image, such as in the form of metadata associated with the image.

At block 406, the method can acquire simulated blur kernels for the lens model. In some cases, the blur kernels and the lens may be installed on an imaging device. In other cases, the blur kernels can be obtained from some type of database or datatable that references various information, such as imaging model and/or lens model to the corresponding simulated blur kernels.

At block 408, the method can enhance the image utilizing the simulated blur kernels. The enhancing can reduce or remove various types of aberrations to enhance the image. Examples of such aberrations can include, focal aberrations, color aberrations, etc. The enhanced image can increase user satisfaction and/or increase the usefulness of the image.

The order in which the above-mentioned methods are described is not intended to be construed as a limitation, and any number of the described blocks can be combined in any order to implement the method, or an alternate method. Furthermore, the method can be implemented in any suitable hardware, software, firmware, or combination thereof, such that a computing device can implement the method. In one case, the method is stored on a computer-readable storage media as a set of instructions such that execution by a computing device causes the computing device to perform the method.

CONCLUSION

Although techniques, methods, devices, systems, etc., pertaining to image enhancement scenarios are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system, comprising:
an individual lens of a known model, wherein the individual lens is configured to focus an image on an image sensor to capture the image and the individual lens shares lens model parameters with multiple other lenses of the known model;
a hardware processor; and
hardware storage storing instructions which, when executed by the hardware processor, cause the hardware processor to:
obtain the captured image;
acquire a simulated blur kernel for the known model of the individual lens, wherein the simulated blur kernel addresses lens model aberrations associated with the lens model parameters shared with the multiple other lenses of the known model, the simulated blur kernel having been produced using a numerical approximation of a diffraction integral computed by summing complex phasors of pixels in an image plane sampling window; and
utilize the simulated blur kernel of the known model to produce an enhanced image from the captured image that accounts for the lens model aberrations.

2. The system of claim 1, wherein the instructions cause the hardware processor to:
perform the numerical approximation to acquire the simulated blur kernel.

3. The system of claim 2, wherein the numerical approximation of the diffraction integral used to produce the simulated blur kernel accounts for glass formulas used by the individual lens and the multiple other lenses of the known model.

4. The system of claim 2, wherein the numerical approximation of the diffraction integral used to produce the simulated blur kernel accounts for a radius of curvature shared by the individual lens and the multiple other lenses of the known model.

5. The system of claim 2, wherein the numerical approximation of the diffraction integral used to produce the simulated blur kernel accounts for lens element diameter shared by the individual lens and the multiple other lenses of the known model.

6. The system of claim 2, wherein the numerical approximation of the diffraction integral used to produce the simulated blur kernel accounts for an antireflection coating material and thickness shared by the individual lens and the multiple other lenses of the known model.

7. A system comprising:
a hardware processor; and
hardware storage storing instructions which, when executed by the hardware processor, cause the hardware processor to:
obtain an image captured through an individual lens, wherein the individual lens is one of several different lenses of a known lens model;
access a point spread function derived from a wave optic simulation of the known lens model, wherein the wave optic simulation uses a numerical approximation that addresses shared characteristics associated with the several different lenses of the lens model to compute the point spread function; and,
use a probabilistic technique to find a likely estimate of a sharp image given the captured image and a blur matrix derived using the point spread function.

8. The system of claim 7, embodied as an imaging device comprising the individual lens.

9. The system of claim 7, wherein the instructions further cause the hardware processor to:
perform the wave optic simulation and the numerical approximation, wherein the numerical approximation approximates a diffraction integral.

10. The system of claim 9, wherein the numerical approximation is calculated using a wavelength or wavenumber parameter of the diffraction integral.

11. The system of claim 9, wherein the numerical approximation of the diffraction integral is calculated using a field intensity parameter of the diffraction integral, the field intensity parameter reflecting a field intensity at a point on a wavefront.

12. The system of claim 9, wherein the numerical approximation of the diffraction integral is calculated using a distance parameter of the diffraction integral reflecting a distance between a point on a wavefront and a point in an image plane.

13. The system of claim 12, wherein the numerical approximation of the diffraction integral is calculated using an angle parameter of the diffraction integral reflecting an angle between a normal to the wavefront and a vector defined by the point on a wavefront and the point in the image plane.

14. The system of claim 7, wherein the captured image includes metadata that identifies an imaging device that captured the image and the instructions further cause the hardware processor to:
perform a refocusing process utilizing simulated defocus kernels obtained from the wave optic simulation to refocus the image.

15. The system of claim 14, wherein the image is a shallow depth of field image and the refocusing process involves deblurring the shallow depth of field image to obtain a sharp image.

16. The system of claim 15, wherein the refocusing process involves using the wave optics simulation to obtain the simulated defocus kernels for several different distances in front of and behind a focal plane of the shallow depth of field image.

17. The system of claim 16, wherein the refocusing process involves finding a labeling for points in the image using kurosis of the image in a pixel window as a data cost and minimizing or reducing the data cost subject to a smoothness constraint.

18. A method performed using a hardware processor, the method comprising:
obtaining an image captured with an individual lens of a known model, wherein the individual lens shares lens model parameters with multiple other lenses of the known model;
acquiring a simulated blur kernel for the known model of the individual lens, wherein the simulated blur kernel addresses lens model aberrations associated with the lens model parameters that are shared with the multiple other lenses of the known model, the simulated blur kernel having been produced using a numerical approximation of a diffraction integral computed using sums of complex phasors of pixels in an image plane sampling window; and
utilizing the simulated blur kernel of the known model to produce an enhanced version of the image that accounts for the lens model aberrations.

19. The method of claim 18, further comprising selecting the simulated blur kernel from a matrix of multiple sampled blur kernels produced using the numerical approximation.

20. The method of claim 18, wherein the utilizing comprises performing a deconvolution operation to produce the enhanced version of the image.

* * * * *